(12) United States Patent
Gunnar Rothoff

(10) Patent No.: US 6,648,308 B2
(45) Date of Patent: Nov. 18, 2003

(54) SPRING APPARATUS

(75) Inventor: Marcus Nils Gunnar Rothoff, Gothenburg (SE)

(73) Assignee: Ford Global Technologies, L.L.C., Dearborn, MI (US)

( * ) Notice: Subject to any disclaimer, the term of this patent is extended or adjusted under 35 U.S.C. 154(b) by 0 days.

(21) Appl. No.: 09/683,639

(22) Filed: Jan. 29, 2002

(65) Prior Publication Data

US 2002/0144872 A1 Oct. 10, 2002

(30) Foreign Application Priority Data

Jan. 29, 2001 (EP) .............................. 01101950

(51) Int. Cl.⁷ .............................. B60G 17/00; F16F 9/46
(52) U.S. Cl. .................. 267/64.17; 280/6.159
(58) Field of Search .................. 267/35, 64.17; 188/315; 280/6.159, 5.514

(56) References Cited

U.S. PATENT DOCUMENTS

| | | |
|---|---|---|
| 3,222,049 A | 12/1965 | Tuczek |
| 3,720,425 A | 3/1973 | Asano et al. |
| 4,054,277 A * | 10/1977 | Sirven .................. 267/35 |
| 4,469,315 A | 9/1984 | Nicholls et al. |
| 5,257,680 A * | 11/1993 | Corcoran et al. .......... 188/129 |
| 5,522,486 A * | 6/1996 | Fulks et al. .................. 188/315 |
| 6,092,816 A * | 7/2000 | Sekine et al. ............ 280/6.159 |

FOREIGN PATENT DOCUMENTS

| | | |
|---|---|---|
| DE | 1135779 | 8/1962 |
| DE | 1948398 | 4/1971 |
| DE | 3816102 C1 | 7/1989 |
| DE | 19507874 A1 | 9/1996 |
| DE | 19849222 A1 | 5/2000 |
| JP | 62289418 | 12/1987 |
| JP | 10250339 | 9/1998 |

* cited by examiner

Primary Examiner—Christopher P. Schwartz
(74) Attorney, Agent, or Firm—Gigette M. Bejin

(57) ABSTRACT

The invention relates to a vehicle spring apparatus comprising housing having fluid sealed therein. The housing comprises a cylinder with a slidably fitted piston and a piston rod connected at one end to said piston. The piston rod extends at the other end outside said cylinder and said cylinder is connected via a passage and a first valve to a first accumulator chamber comprising a springing medium. The cylinder is connected via a passage and a second valve to a second accumulator chamber comprising a springing medium, and said accumulator chambers is also connected with each other via at least one controllable pump. The invention also relates to a vehicle height adjusting system and a vehicle comprising the vehicle spring apparatus.

11 Claims, 4 Drawing Sheets

SPRING APPARATUS

BACKGROUND OF INVENTION

1. Field of the Invention

The present invention relates to a vehicle spring apparatus. The present invention also relates to a vehicle height adjusting system using such a vehicle spring apparatus.

2. Technical Background

In vehicles having a relatively large load-carrying capacity, e.g. vans or station wagons, the vehicle height may vary to a considerable extent with a change in carrying load depending on the fact that occupants get on and off the vehicle, or goods or baggage is loaded onto or unloaded from the vehicle. This affects the body motion control and the steering system. Therefore there has been a demand for a suspension apparatus capable of automatically maintaining ride height irrespective of variations in the carrying load.

There has heretofore been proposed damper suspension means for vehicles, for example, in U.S. Pat. No. 4,273,358. In this prior art hydraulic damper, an oil tank and a reservoir have a high-pressure gas sealed therein. A pump device supplies a hydraulic fluid from the oil tank into a working chamber to provide response pressure to the extension and the contraction of a piston rod. At least one diaphragm is provided to separate the different media in the working chamber. This prior art system is one of many examples of systems using controlled hydro pneumatic units with a pressure supply from a hydraulic pump.

The hydraulic supply calls for hydraulic linings and hydraulic pumps and is complex and generally makes the manufacturing process of a vehicle complicated, costly and time-consuming.

An alternative to the above outlined system is a self-pumping hydraulic damper. However, this prior art self-pumping hydraulic damper suffers from some issues. After a vehicle equipped with the self-pumping hydraulic damper has run with no baggage loaded thereon, the pressure of the hydraulic fluid in the cylinder has been adjusted to a low level according to the small carrying load. If the vehicle in under these conditions is loaded with baggage, the vehicle height is lowered by an amount corresponding to an increase in the carrying load. As the vehicle loaded with the baggage runs, the pump device operates to supply the pressure fluid from the oil tank into the working chamber, causing the vehicle height to rise gradually. In this way, the vehicle height is adjusted to a predetermined level. In this case, when starting running when pumping has not yet been sufficiently effected, the vehicle runs in a state where the vehicle height is still low.

Accordingly, the road clearance is insufficient, and the underside of the vehicle is likely to touch the ground. Therefore, when the carrying load is heavy or when the vehicle passes an uneven spot on the road, the underside of the vehicle may touch the ground unfavorably.

U.S. Pat. No. 6,092,816 describes a system with a high pressure accumulator tank connected to a working chamber via a switching valve. The pressure of the system may also be relieved. Accordingly, the vehicle height can be adjusted to a level within the standard vehicle height range even immediately after the vehicle in unloaded condition has been loaded with baggage, for example.

It is of course important to improve the driving safety, maintaining the body motion control and the tire-road contact also in severe maneuvers and other extreme situations outside the standard vehicle range, without causing damage to the spring and damper system of the vehicle. At the same time it is important to provide a system that is robust, simple and easy to manufacture and yet not overly costly.

SUMMARY OF INVENTION

The object of the present invention is to provide a spring apparatus that overcomes the above issues, and makes it possible to provide an actively controllable vehicle spring apparatus.

A further object of the present invention is to provide a vehicle spring apparatus integrated in one unit.

It is still a further object to provide a spring apparatus that achieves these and other objects but are yet inexpensive and especially simple to manufacture and install in a vehicle.

These and other objects are achieved by a spring apparatus according to claim 1. Preferred embodiments of the invention is defined in given by the dependent claims. A further object is to provide an accurate and reliable vehicle height adjusting system, which system is further described in claim 9.

According to the invention there is provided a vehicle spring apparatus comprising, a housing having fluid sealed therein, the housing comprising, a cylinder with a slidably fitted piston, a piston rod connected at one end thereof to the piston, the piston rod extending at the other end thereof to outside of the cylinder, characterized in that, the cylinder is connected via a passage and a first valve to a first accumulator chamber comprising a springing medium, the cylinder is connected via a passage and a second valve to a second accumulator chamber comprising a springing medium, and the accumulator chambers also being connected with each other via at least one controllable pump.

This arrangement makes it possible to provide an actively controllable springing of a vehicle spring apparatus, which apparatus is simple to manufacture and install in a vehicle. The response to the strokes of the piston rod caused by vibrations of the vehicle during running will cause pressure changes in the apparatus. Both the accumulators are fitted with a springing medium. When the piston rod is in motion, the apparatus is preferably arranged so that one valve only allows fluid into its accumulator causing an increase of the pressure in the accumulator and the other valve only permits fluid to exit from its accumulator, which result in a flow into one of the accumulators and out of the other accumulator depending on the strokes of the piston rod. The pressure thus increases in one of the accumulators and decreases in the other accumulator of the spring apparatus. The higher pressure in one of the two accumulators, the higher force acting from the spring apparatus is achieved. A controllable pump controls the pressure difference between the two accumulators so that a least a necessary and even desired pressure range is adaptable during operation.

In an embodiment of the inventive vehicle spring apparatus, there is provided a passage for transporting the fluid from one side to one other side of the piston. This makes it possible to connect a damper to the passage in accordance with a second embodiment of the invention. Thus a springing and damping apparatus is provided that may be integrated in one unit. By virtue of the above-described arrangement, a robust vehicle spring apparatus can be obtained.

In a preferred embodiment of the invention the controllable pump is electrically controlled. Thus, the apparatus can be integrated into one electrically fed unit. This arrangement makes it possible to provide a spring and damper apparatus that is not dependent on external hydraulic supply. Hydraulic prior art systems are sometimes complex and difficult to install in a vehicle. By providing the possibility of an integrated springing apparatus the manufacturing process is facilitated.

The vehicle spring apparatus is in a preferred embodiment adapted for connection between sprung and unsprung parts of a vehicle. The simple structure which constitutes a preferred embodiment of the present vehicle spring apparatus invention makes it easy to connect sprung and unsprung parts, and preferably the body and the wheel-suspension of a vehicle are connected by means of the spring apparatus.

In a further preferred embodiment of the invention the first valve is a unidirectional valve only permitting flow in the direction from the cylinder towards the first accumulator and the second valve is a unidirectional valve only permitting flow in the direction from the second accumulator and towards the cylinder.

It is a further advantage of the present invention that by using simple unidirectional valves the need for steering and switching valves to achieve desired pressure levels in the apparatus is kept at a minimum.

In an embodiment of the present invention the vehicle spring apparatus comprises a connection to a control unit for controlling the apparatus actively. This control unit provides a further advantage of the inventive spring apparatus in making the active control of the unit more precise.

The invention also relates to a vehicle height adjusting system comprising the spring apparatus and, vehicle height detectors for detecting the vehicle height, a control unit, the vehicle spring apparatus being provided between sprung and unsprung parts of the vehicle, wherein the pump fitted between the accumulator chambers may be fed with power for transferring fluid from the second accumulator chamber to the first accumulator chamber in order to increase the distance between sprung and unsprung parts of the vehicle, whereas when the distance between sprung and unsprung parts of the vehicle is to be reduced a fluid transfer from the first accumulator chamber to the second accumulator chamber is performed. This height adjusting system provides a robust, simple and safe system for keeping at least a necessary vehicle height range during operation.

In a further embodiment of the invention a vehicle is provided with at least one vehicle spring apparatus. In an alternative further embodiment of the invention a vehicle is provided with one spring apparatus between the body and wheel-suspension in each of the four corners of the vehicle. In a preferred embodiment of the invention there is provided a vehicle comprising a height adjusting system. The height adjusting system according to the invention comprises a vehicle spring apparatus. This arrangement makes it possible to provide a vehicle with more accurate springing and damping in relation to the prevailing operating conditions.

BRIEF DESCRIPTION OF DRAWINGS

A currently preferred embodiment of the present invention will now be described in more detail, with reference to the accompanying drawings.

DETAILED DESCRIPTION

A first embodiment of the invention related to a spring apparatus for a vehicle will be described in more detail in the following with reference to the accompanying drawings.

Figure 1:
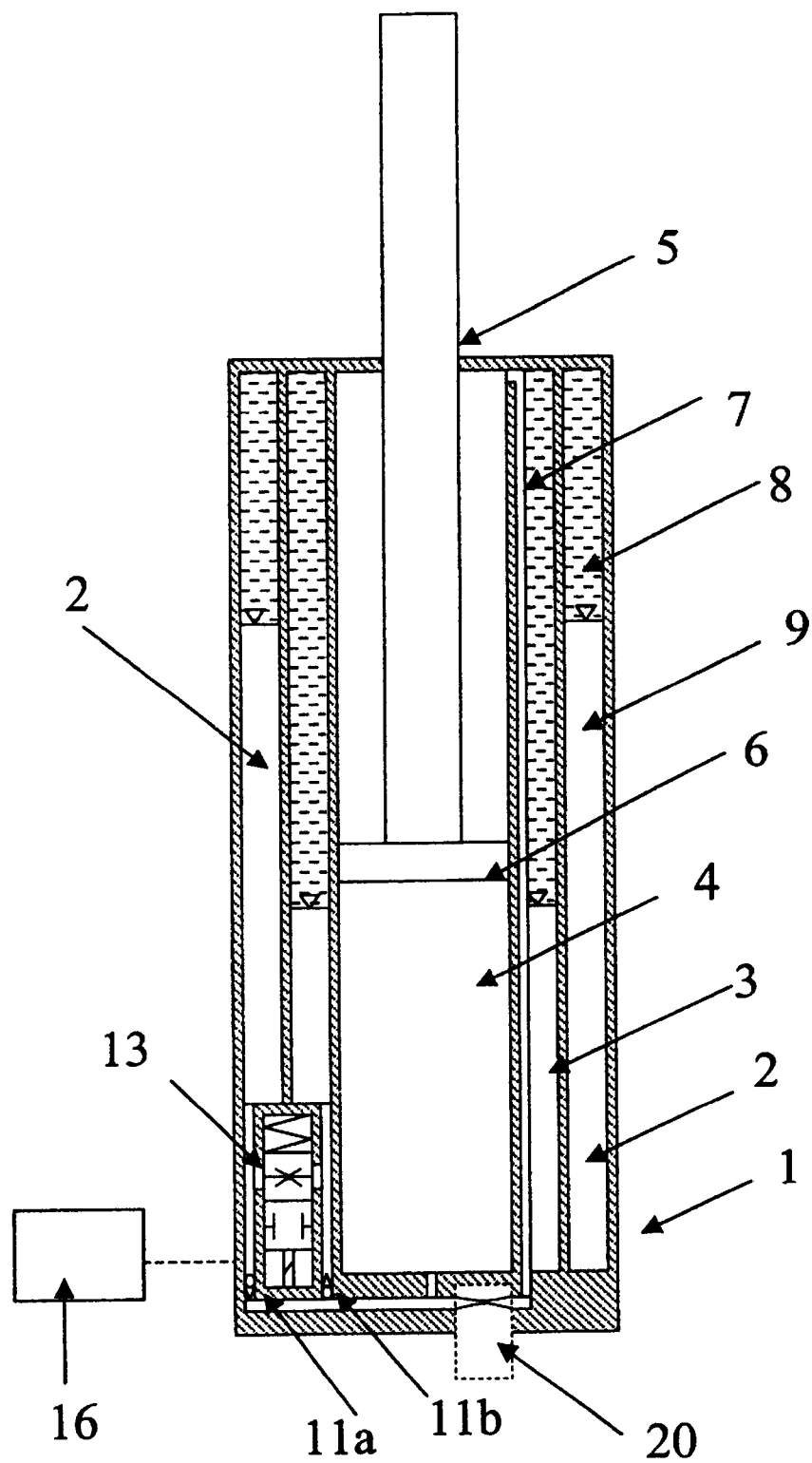
FIG. 1 is a schematic sectional view of an embodiment of a spring apparatus according to a first embodiment of the present invention.

Referring now to FIG. 1, a spring apparatus 1 according to this embodiment has a cylinder housing. A cylinder 4 is provided in the housing. Two annular accumulator chambers 2, 3 one first chamber 2 and one second chamber 3, are formed around the cylinder 4. A piston 6 is slidably fitted in the cylinder 4 The piston 6 divides the inside of the cylinder 4 into two chambers, i.e. a cylinder upper rebound chamber and a cylinder lower compression chamber. One end of a piston rod 5 is connected to the piston 6. The other end portion of the piston rod 5 extends through the housing and projects to the outside of the cylinder 4. The housing, comprising the two accumulator chambers 2, 3 has a fluid 9 sealed therein.

The cylinder 4 is connected via a passage and a first unidirectional valve 11a to first accumulator chamber 2 comprising a springing medium 8. The cylinder 4 is also connected via a passage and a second valve 11b to second accumulator chamber 3 comprising a springing medium 8. The accumulator chambers 2, 3 are also being connected with each other via at least one controllable pump 13. A passage 7 is provided for transporting the fluid 9 from one side to one other side of the piston 6. A damper unit 20 is connected to the passage 7. Preferably a controllable damper unit 20 may be used. According to the requirements, alternative damper units 20 of a conventional type for vehicle spring and damper devices may be used to provide damping to the apparatus 1.

The controllable pump 13 is electrically controlled and is preferably integrated into one electrically fed unit, i.e. the vehicle spring apparatus. Further the spring apparatus has a connection to a control unit 16 for controlling the apparatus actively. Together with vehicle height detectors (not shown here) for detecting the vehicle height, the control unit processes the detected data. The spring apparatus is arranged between a sprung and an unsprung part of the vehicle.

In an alternative embodiment of the present invention the spring apparatus 1 is used in a vehicle height adjusting system. The pump 13 fitted between the accumulator chambers 2, 3 may be fed with power for transferring fluid from the second accumulator chamber 3 to the first accumulator chamber 2 in order to increase the distance between sprung and unsprung parts of the vehicle 23. When the distance between sprung and unsprung parts of the vehicle 23 is to be reduced a fluid transfer from the first accumulator chamber 2 to the second accumulator chamber 3 is performed. The above-described operations are performed based on information regarding the prevailing vehicle height from the vehicle height sensors, and with the information the vehicle height can be more actively controlled. A control unit connected to the spring apparatus can be used to control the pump 13 and also to process the necessary information from the vehicle height detecting system in order to control and adjust the height of the vehicle.

The apparatus 1 is adapted for connection between sprung and unsprung parts of a vehicle 23. Preferably the apparatus has means (not shown) for being attached in one end to the body of a vehicle and the other end to the wheel-suspension.

Figure 2:
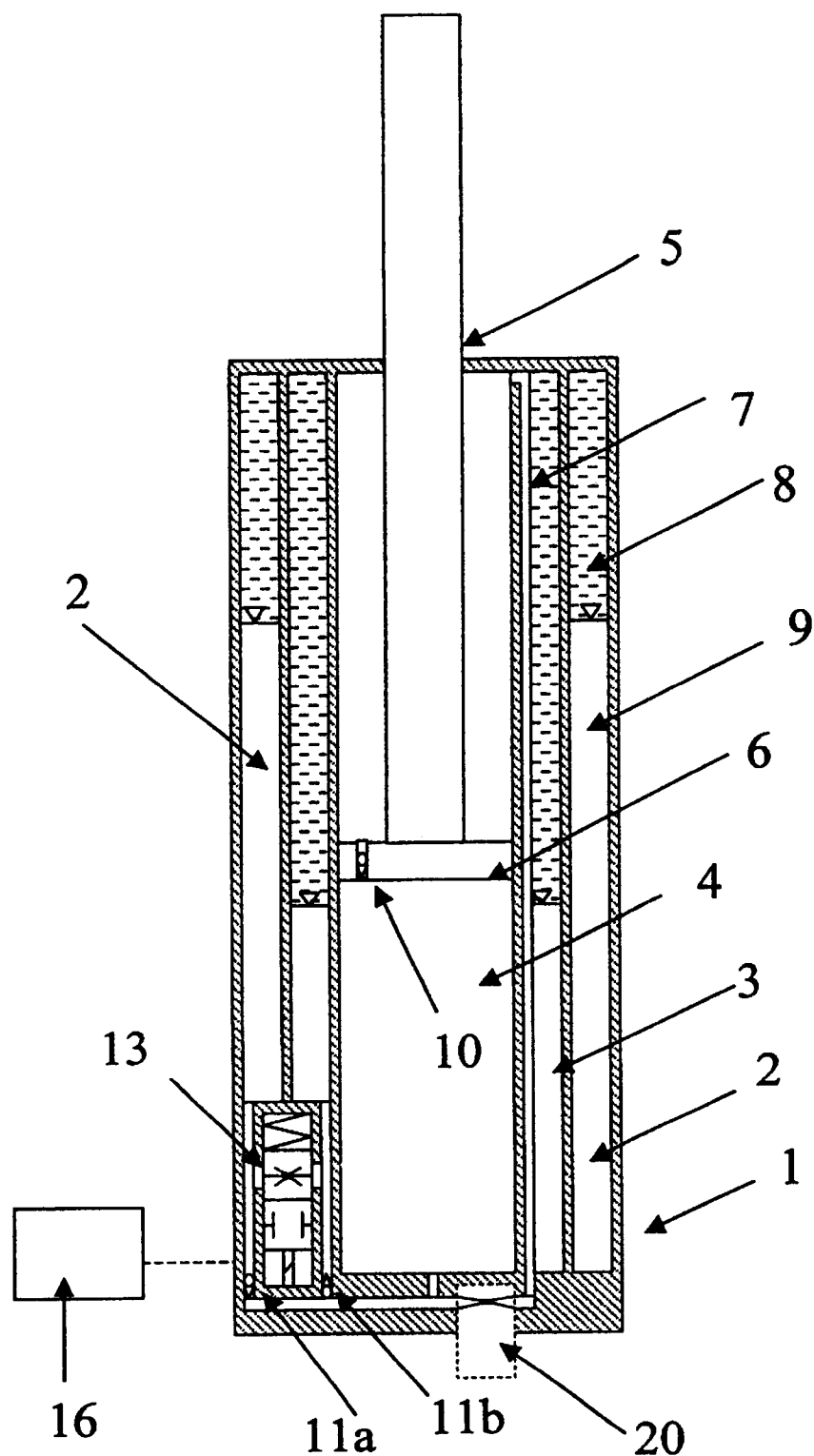
FIG. 2 is a schematic sectional view of an embodiment of a spring apparatus according to a second embodiment of the present invention.

FIG. 2 illustrates a second embodiment of the invention is presented, wherein the piston 6 being provided with an additional fluid passage 10 through the piston itself compared to the first embodiment. This fluid passage 10 provides among other things damping to the system.

Figure 3A:
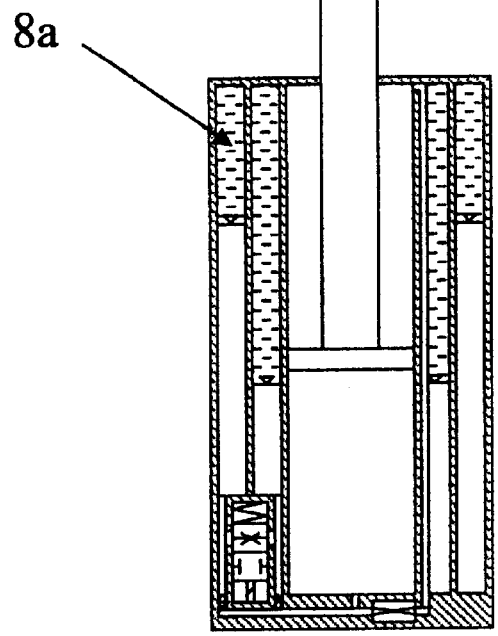
FIG. 3a is a schematic sectional view of an alternative embodiment of a spring apparatus according to an embodiment of the present invention.
Figure 3B:
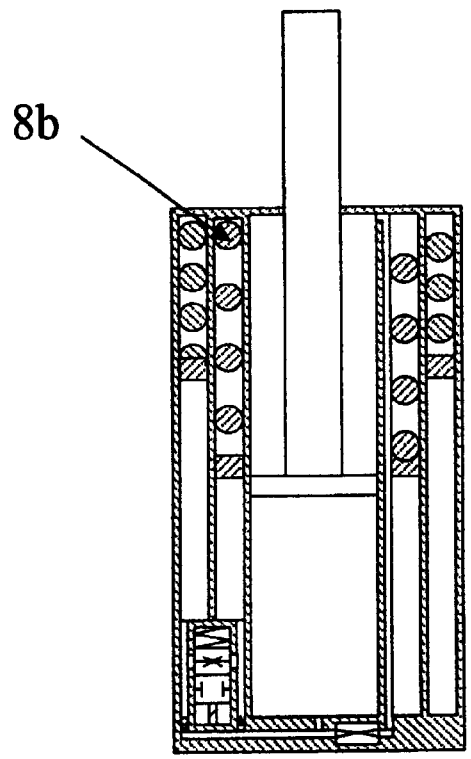
FIG. 3b is a schematic sectional view of another alternative embodiment of a spring apparatus according to an embodiment of the present invention.
Figure 3C:
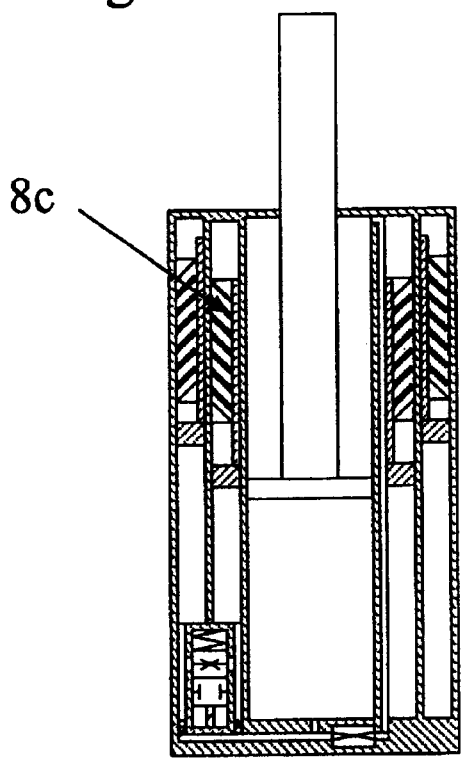
FIG. 3c is a schematic sectional view of yet another alternative embodiment of a spring apparatus according to an embodiment of the present invention.

With reference to FIGS. 3a–3c the springing medium 8 fitted in the accumulator chambers 2, 3 will be further explained. The springing medium 8 fitted in the accumulator chambers 2, 3 is a pneumatic medium 8a. The springing medium can also be a rubber-like type material spring 8c or a steel coil 8b. The spring may be dimensioned as a main spring or as an auxiliary spring. The fluid is preferably sealed from the springing medium. Sealing may not be necessary in case a rubber-like material 8c is used as springing medium.

Figure 4:
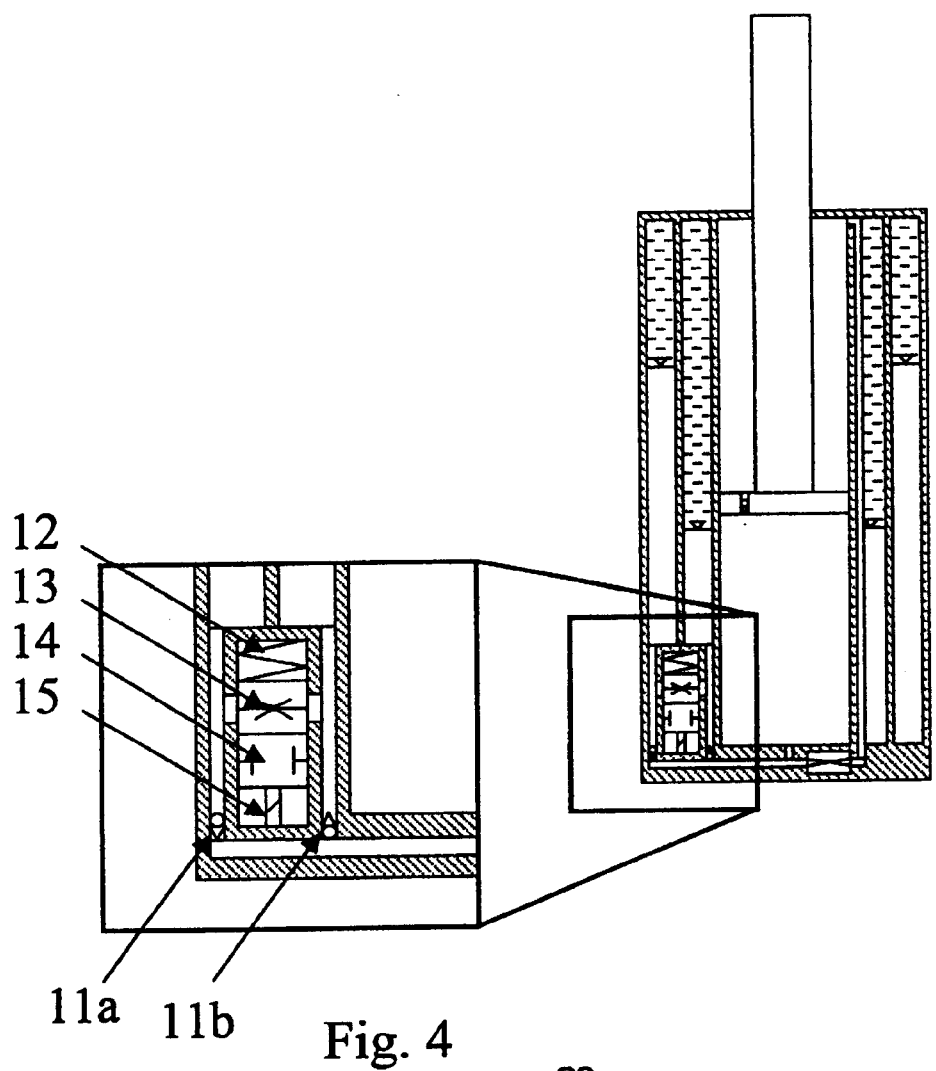
FIG. 4 is an enlarged partial view of a spring apparatus according to an embodiment of the invention.

FIG. 4 is a schematic view of the pump 13 in an enlarged partial view. In a preferred embodiment of the pump 13 the pump is electrically powered from its one end of the pump 13. The pressure can be controlled between the accumulator chamber 3 and the accumulator chamber 2, without any movement of the piston in the cylinder 4. When increasing the pressure in the chamber 2, energy is needed to control the pump. The pressure in the chamber 3 is then decreased. If the pressure is reduced in the chamber 2, this makes it possible to recover energy by the pump. The energy can be used for reloading a battery. Thus, the overall energy demand in the system can be restricted.

Figure 5:
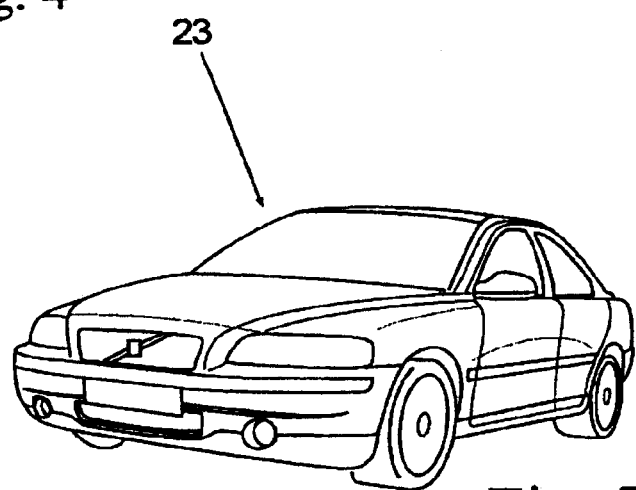
FIG. 5 is a perspective view of a an example of a vehicle appropriate for a spring apparatus according to an embodiment of the invention.

FIG. 5 shows a further preferred embodiment of the invention, i.e. a vehicle 23 provided with the inventive controllable vehicle height and springing system.

The present invention should not be considered as being limited to the above-described preferred embodiment, but rather includes all possible variations covered by the scope defined by the appended claims.

It is thus to be appreciated that the above described spring apparatus can comprise any kind of prior art damper unit but preferably a small type (e.g. one damper manufactured by Ulins) that can be fitted in the spring apparatus.

The size and shape of the piston rod can be modified in order to provide the appropriate pressure levels required to adjust the height of the vehicle. The spring apparatus according to the invention can be arranged at the back of the vehicle. The inventive apparatus can also be arranged only in the front depending on the requirements.

The exact shape and size of the spring apparatus and its features e.g. the accumulator chambers can also be modified in order to meet specific requirements and are in the above only given as a guidance.

The spring apparatus is intended for all kinds of vehicles such as trucks, vans, tanks etc. and is not limited to a car as shown in FIG. 5.

What is claimed is:

1. A vehicle spring apparatus comprising:
a housing having fluid sealed therein;
a cylinder with a slidably fitted piston;
a piston rod connected an one end thereof to said piston, said piston rod extending at the other end thereof to outside of said cylinder, said cylinder being connected via a passage and a first valve to a first accumulator chamber comprising a springing medium, said cylinder is connected via a passage and a second valve to a second accumulator chamber comprising a springing medium, and said accumulator chambers also being connected with each other via at least one controllable pump in order to vary the distance between the sprung and unsprung mode of the vehicle.

2. A vehicle spring apparatus according to claim 1, wherein a passage is provided for transporting said fluid from one side to one other side of said piston.

3. A vehicle spring apparatus according to claim 2, wherein a damper unit is connected to said passage.

4. A vehicle spring apparatus according to claim 1, wherein said controllable pump is electrically controlled.

5. A vehicle spring apparatus according to claim 1, wherein said apparatus is integrated into one electrically fed unit.

6. A vehicle spring apparatus according to claim 1, wherein said apparatus is adapted for connection between sprung and unsprung parts of a vehicle.

7. A vehicle spring apparatus according to claim 1, wherein said first valve is a unidirectional valve only permitting flow in direction from said cylinder towards said first accumulator and said second valve is a unidirectional valve only permitting flow in direction from said second accumulator and towards said cylinder.

8. A vehicle spring apparatus according to claim 1, wherein said apparatus comprises a connection to a control unit for controlling said apparatus actively.

9. A vehicle height adjusting system having a vehicle spring apparatus, the system comprising:
a housing having fluid sealed within the housing;
a cylinder with a slidably fitted piston;
a piston rod connected at one end thereof to said piston, said piston rod extending at the other end thereof to outside of said cylinder, wherein said cylinder is connected via a passage and a first valve to a first accumulator chamber having a springing medium, said cylinder being connected via a passage and a second valve to a second accumulator chamber having a springing medium,
said accumulator chambers also being connected with each other via at least one controllable pump and a plurality of vehicle height detectors for detecting the vehicle height;
a control unit;
a vehicle spring apparatus being provided between sprung and unsprung parts of said vehicle,
wherein the pump fitted between said accumulator chambers may be fed with power for transferring fluid from the second accumulator chamber to the first accumulator chamber in order to increase the distance between sprung and unsprung parts of said vehicle wherein the distance between sprung and unsprung parts of said vehicle is to be reduced a fluid transfer from said first accumulator chamber to said second accumulator chamber is performed.

10. A vehicle comprising a vehicle spring apparatus comprising:
a housing having fluid sealed therein;
a cylinder with a slidably fitted piston; and
a piston rod connected at one end thereof to said piston, said piston rod extending at the other end thereof to outside of said cylinder, wherein said cylinder is connected via a passage and a first valve to a first accumulator chamber comprising a first springing medium, said cylinder is connected via a passage and a second valve to a second accumulator chamber having a second springing medium, and said accumulator chambers also being connected with each other via at least one controllable pump.

11. A vehicle comprising a height adjusting system having a vehicle spring apparatus, the system comprising:

a housing having fluid sealed therein;

a cylinder with a slidably fitted piston;

a piston rod connected at one end thereof to said piston, said piston rod extending at the other end thereof to outside of said cylinder wherein said cylinder is connected via a passage and a first valve to a first accumulator chamber comprising a springing medium, said cylinder is connected via a passage and a second valve to a second accumulator chamber comprising a springing medium, said accumulator chambers also being connected with each other via at least one controllable pump and, vehicle height detectors for detecting the vehicle height;

a control unit;

said vehicle spring apparatus being provided between sprung and unsprung parts of said vehicle, wherein the pump fitted between said accumulator chambers may be fed with power for transferring fluid from the second accumulator chamber to the first accumulator chamber in order to increase the distance between sprung and unsprung parts of said vehicle, whereas when the distance between sprung and unsprung parts of said vehicle is to be reduced a fluid transfer from said first accumulator chamber to said second accumulator chamber is performed.

* * * * *